US012045890B2

(12) United States Patent
Gore et al.

(10) Patent No.: US 12,045,890 B2
(45) Date of Patent: *Jul. 23, 2024

(54) VIRTUAL ASSISTANT FOR RECOMMENDATIONS ON WHETHER TO ARBITRATE CLAIMS

(71) Applicant: Allstate Insurance Company, Northbrook, IL (US)

(72) Inventors: Caleb Gore, Northbrook, IL (US); Don Jungwirth, Northbrook, IL (US); John Kelsh, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,859

(22) Filed: Sep. 20, 2021

(65) Prior Publication Data

US 2022/0005126 A1   Jan. 6, 2022

Related U.S. Application Data

(63) Continuation of application No. 15/263,883, filed on Sep. 13, 2016, now Pat. No. 11,127,082.

(60) Provisional application No. 62/240,480, filed on Oct. 12, 2015.

(51) Int. Cl.
*G06Q 40/08* (2012.01)
*G06Q 10/087* (2023.01)

(52) U.S. Cl.
CPC .......... *G06Q 40/08* (2013.01); *G06Q 10/087* (2013.01)

(58) Field of Classification Search
None
See application file for complete search history.

(56) References Cited

U.S. PATENT DOCUMENTS

| 7,957,986 | B1 * | 6/2011 | Hail ..................... G06Q 10/10 705/3 |
| 9,792,656 | B1 * | 10/2017 | Konrardy ......... G08G 1/096758 |
| 2007/0016542 | A1 * | 1/2007 | Rosauer ............... G06Q 10/067 706/21 |
| 2007/0282824 | A1 * | 12/2007 | Ellingsworth ........ G06F 16/313 707/999.005 |

(Continued)

OTHER PUBLICATIONS

Notice of Allowance for U.S. Appl. No. 15/263,883 dated May 19, 2021, 8 pages.

(Continued)

*Primary Examiner* — William J Jacob
(74) *Attorney, Agent, or Firm* — Akerman LLP

(57) ABSTRACT

Systems and methods provide for an automated system for determining whether claims related to an insured item should proceed to an arbitrating body. A virtual assistant (also referred to herein as an "arbitration assessment assistant") installed in a computing device (e.g., computer, laptop, tablet computer, mobile phone, etc.) may be responsible for managing and assisting an insurance representative (e.g., an insurance adjuster, subrogation representative, etc.) in determining liability and fault relating to a claim, conducting a subrogation process, and ultimately determining whether the claim should be submitted for arbitration. In one or more aspects discussed, herein the process may be fully automated.

20 Claims, 5 Drawing Sheets

(56) References Cited

U.S. PATENT DOCUMENTS

| | | | | |
|---|---|---|---|---|
| 2007/0288273 A1* | 12/2007 | Rojewski | ............ | G06Q 10/0635 |
| | | | | 705/35 |
| 2008/0077451 A1* | 3/2008 | Anthony | ................ | G06Q 40/08 |
| | | | | 705/4 |
| 2008/0235064 A1* | 9/2008 | Gulko | .................... | G06Q 40/00 |
| | | | | 257/E21.133 |
| 2008/0243556 A1* | 10/2008 | Hogan | .................. | G06Q 10/10 |
| | | | | 705/4 |
| 2009/0300065 A1* | 12/2009 | Birchall | ................ | G06Q 40/08 |
| | | | | 705/305 |
| 2011/0320223 A1* | 12/2011 | Drennan, III | .......... | G06Q 40/08 |
| | | | | 707/E17.014 |
| 2013/0304517 A1* | 11/2013 | Florence | ................ | G06Q 40/08 |
| | | | | 705/4 |
| 2014/0149144 A1* | 5/2014 | Li | .......................... | G06Q 10/10 |
| | | | | 705/4 |
| 2016/0132969 A1* | 5/2016 | Gunjan | ................. | G06Q 40/08 |
| | | | | 705/4 |
| 2016/0364535 A1* | 12/2016 | Kusens | ................. | G06Q 40/08 |

OTHER PUBLICATIONS

Office Action for U.S. Appl. No. 15/263,883 dated Feb. 21, 2019, 11 pages.
Office Action for U.S. Appl. No. 15/263,883 dated Feb. 7, 2020, 13 pages.
Office Action for U.S. Appl. No. 15/263,883 dated Oct. 1, 2019, 13 pages.

* cited by examiner

VIRTUAL ASSISTANT FOR RECOMMENDATIONS ON WHETHER TO ARBITRATE CLAIMS

CROSS-REFERENCE TO RELATED APPLICATIONS

This application is a continuation of U.S. patent application Ser. No. 15/263,883, filed on Sep. 13, 2016, now U.S. Pat. No. 11,127,082, which claims priority to and the benefit of U.S. patent application Ser. No. 62/240,480, filed on Oct. 12, 2015, the contents of which are incorporated herein in their entirety by reference.

TECHNICAL FIELD

The present disclosure relates to systems and methods for determining fault attribution for an insurance claim and assisting an insurance adjuster or subrogation representative in obtaining and analyzing additional information to determine whether to proceed to arbitration with respect to the insurance claim.

BACKGROUND

Insurance providers receive insurance claims relating to vehicular accidents involving policy holders. The insurance providers must determine the liability of the policy holders and pay the appropriate entities for covered losses. However, in many cases, third parties (and not the policy holders) may be at fault for the accidents. In such cases, the insurance providers may seek subrogation from the third parties and/or the insurance providers of the third parties. If the third parties and/or the insurance providers of the third parties refuse to reimburse for expenses incurred by the insurance providers of the policy holders, the insurance providers of the policy holders may submit the claim for arbitration by an arbitrator.

Current approaches and processes for determining whether to arbitrate a claim are time-consuming as it involves interaction with multiple insurance providers, insurance agents, claims adjusters, subrogation representatives, individuals involved in the accident or a witness to the accident, and the like. Further, less experienced insurance adjusters might not know what information is needed for every possible scenario for use in determining whether a claim should proceed to arbitration. As a result, there is inconsistency among different insurance providers as to the information on which they are basing such determinations.

Therefore, a need exists for improved approaches to processing claims where subrogation is involved to provide consistent and accurate determinations whether an insurance claim should proceed to arbitration.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the disclosure involve a streamlined and efficient process for claims management and disclose methods, computer-readable media, and apparatuses for automating the determining whether claims related to an insured item should proceed to an arbitrating body. A virtual assistant (also referred to herein as an "arbitration assessment assistant") installed in a computing device (e.g., computer, laptop, tablet computer, mobile phone, etc.) may be responsible for managing and assisting an insurance representative (e.g., an insurance adjuster, subrogation representative, etc.) in determining liability and fault relating to an insurance claim, conducting a subrogation process, and ultimately determining whether the insurance claim should be submitted for arbitration. In one or more aspects discussed herein, the process may be fully automated. That is, the arbitration assessment assistant, once triggered, may determine fault, attempt to subrogate the insurance claim, and output a recommendation as to whether the claim should be submitted for arbitration.

The arbitration assessment assistant may also be responsible for analyzing the insurance claim, identifying missing information useful in determining whether the claim should be arbitrated, obtaining the missing information from various data sources, and analyzing the obtained information to perform the above-described functions (e.g., determining liability, fault, and/or whether to proceed to arbitration).

Further aspects of the disclosure may be provided in a computer-readable medium having computer-executable instructions that, when executed, cause a computer, user terminal, or other apparatus to at least perform one or more of the processes described herein.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, serve to explain the principles of the disclosure. In the drawings:

DETAILED DESCRIPTION

In accordance with various aspects of the disclosure, methods, computer-readable media, and apparatuses are disclosed through which determinations whether insurance claims should be submitted for arbitration through an enhanced automated process. In certain aspects, when an arbitration assessment computing device (e.g., an insurance adjuster's mobile device) receives an insurance claim, the computing device (or an application executing on the computing device) may analyze the claim, identify missing information useful in determining whether the claim should proceed to arbitration, obtain such information from a variety of data sources, analyze the obtained information, determine fault, attempt to subrogate the insurance claim, and make a determination as to whether the insurance claim should proceed to arbitration.

The automated process may utilize various specialized hardware components (e.g., processors, communication servers, memory devices, sensors, etc.) and related particular computer algorithms to obtain data related to the insurance claim, determine fault, engage in subrogation, and determine whether the claim should proceed to arbitration.

Figure 1:
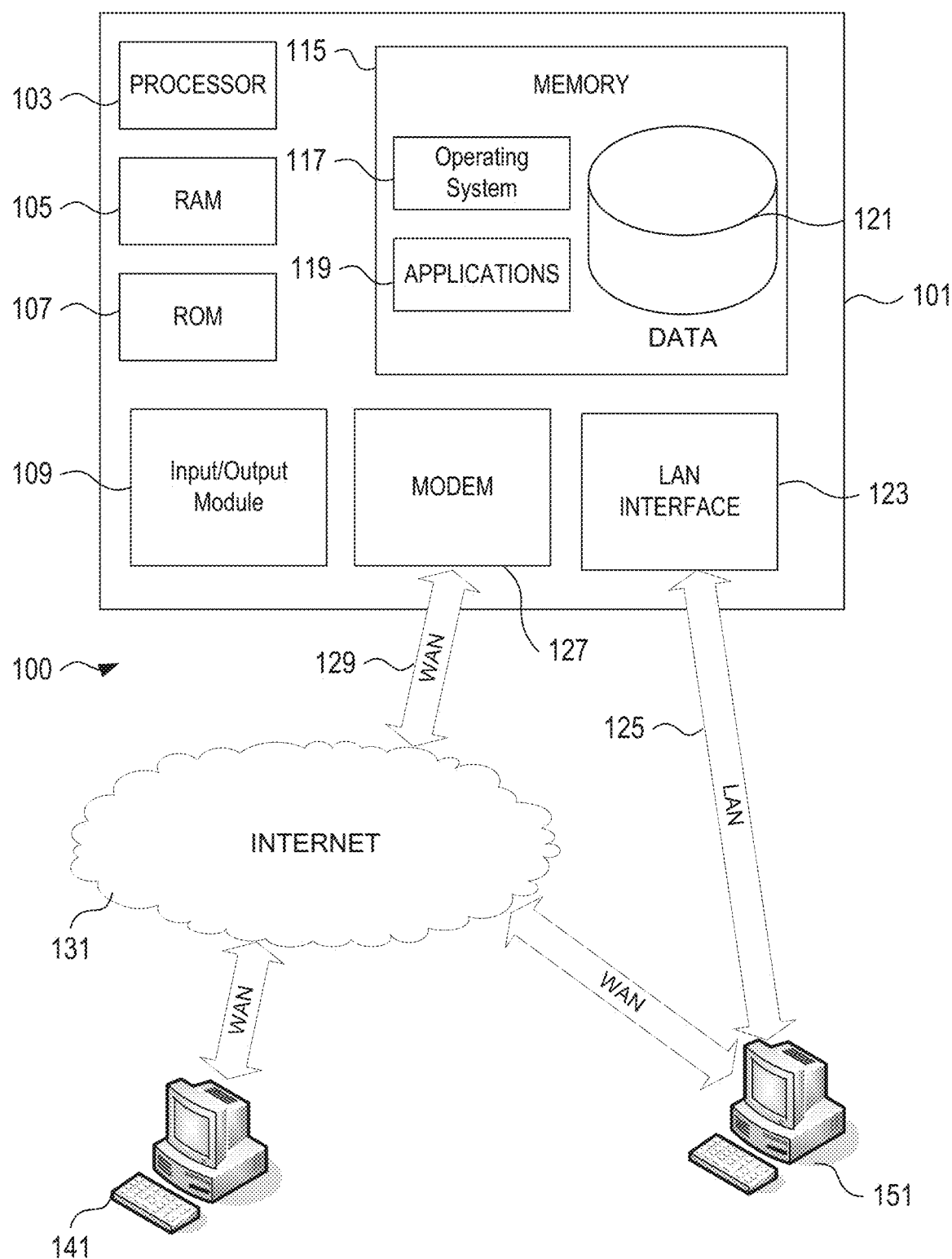
FIG. 1 shows an illustrative operating environment in which various aspects of the disclosure may be implemented.

FIG. 1 illustrates a block diagram of an arbitration assessment computing device 101 (e.g., a computer, laptop, tablet computer, mobile phone) in communication system 100 that may be used according to an illustrative embodiment of the disclosure. The arbitration assessment computing device 101 may have a processor 103 for controlling overall operation of the arbitration assessment computing device 101 and its associated components, including RAM 105, ROM 107, input/output module 109, and memory 115.

I/O 109 may include a microphone, keypad, touch screen, and/or stylus through which a user of arbitration assessment computing device 101 may provide input, and may also include one or more of a speaker for providing audio output and a video display device for providing textual, audiovisual, and/or graphical output. Software may be stored within memory 115 to provide instructions to processor 103 for enabling device 101 to perform various functions. For example, memory 115 may store software used by the arbitration assessment computing device 101, such as an operating system 117, application programs 119, and an associated database 121. Processor 103 and its associated components may allow the device 101 to run a series of computer-readable instructions to analyze data relating to an insurance claim. Processor 103 may identify missing information useful in determining whether to arbitrate the insurance claim and may obtain such information from a variety of data sources. In addition, processor 103 may assess the liability and fault relating to the insurance claim using the obtained information and data relating to the claim to determine whether the insurance claim should proceed to arbitrator for adjudication The arbitration assessment computing device 101 may operate in a networked environment supporting connections to one or more remote computers, such as terminals 141 and 151. The terminals 141 and 151 may be personal computers or servers that include many or all of the elements described above relative to the arbitration assessment computing device 101. Also, terminal 141 and/or 151 may be data stores for storing data relating to insurance claims that have been analyzed by the arbitration assessment computing device 101 in the past. In yet other embodiments, terminal 141 may represent a device for management of a virtual assistant installed on the arbitration assessment computing device 101.

The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the arbitration assessment computing device 101 according to an illustrative embodiment of the disclosure may include computer executable instructions for invoking functionality related to determining fault and whether an insurance claims should proceed to arbitration.

The arbitration assessment computing device 101 and/or terminals 141 or 151 may also be mobile terminals including various other components, such as a battery, speaker, camera, and cellular antennas (not shown). The cellular antennas may wirelessly communicate via one or more channels with a base station, which may relay the communication to one or more other computing devices.

The disclosure is operational with numerous other special purpose computing system environments or configurations. Examples of some computing systems, environments, and/or configurations that may be suitable for use with the disclosure include, but are not limited to, personal computers, server computers, hand-held or laptop devices, tablets, mobile phones, multiprocessor systems, microprocessor-based systems, set top boxes, programmable consumer electronics, network PCs, minicomputers, mainframe computers, and distributed computing environments that include any of the above systems or devices, are configured to perform the processes described herein, and the like.

The disclosure may be described in the context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including non-transitory memory storage devices, such as a hard disk, random access memory (RAM), and read only memory (ROM).

Figure 2:
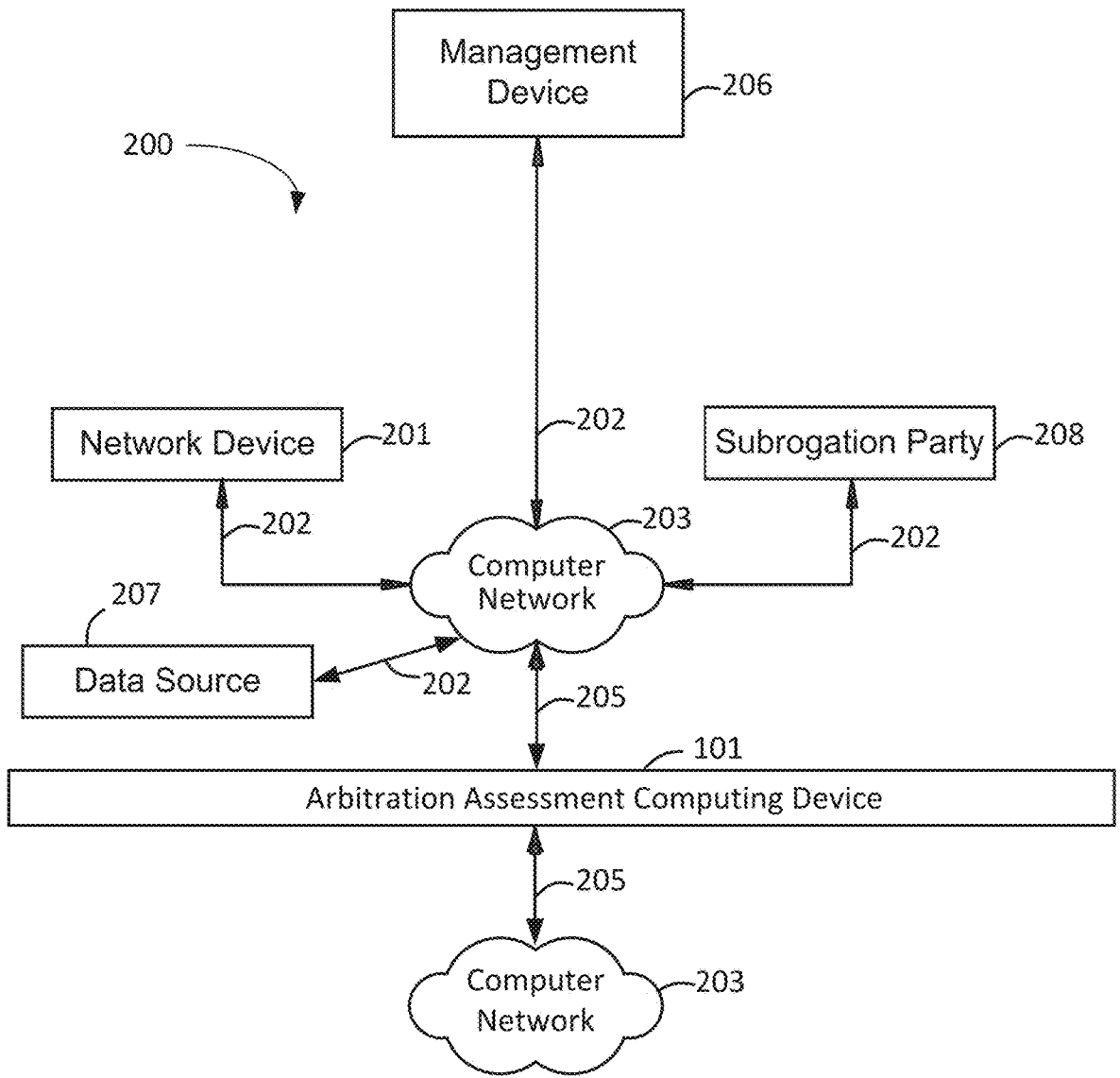
FIG. 2 shows a system of network devices and servers that may be used to implement the processes and functions of certain aspects of the present disclosure.

Referring to FIG. 2, a system 200 for implementing methods according to the present disclosure is shown. As illustrated, system 200 may include one or more network devices 201. Devices 201 may be local or remote, and are connected by one or more communications links 202 to computer network 203 that is linked via communications links 205 to arbitration assessment computing device 101. In certain embodiments, network devices 201 may run different algorithms used by arbitration assessment computing device 101 for analyzing an insurance claim and any other data associated with the insurance claim, identifying and obtaining missing information relevant to fault determinations, subrogation determinations, and/or arbitration assessment determinations, or, in other embodiments, network devices 201 may be data stores for referencing such information. In yet other embodiments, network devices 201 may represent mobile user devices of other insurance representatives (e.g., other insurance claims adjusters) and may also be configured to perform any of the functions discussed herein as the arbitration assessment computing device 101. In system 200, arbitration assessment computing device 101 may be any suitable server, processor, computer, tablet computer, mobile device, mobile phone, or data processing device appropriately configured with hardware and/or software to perform various functions described herein.

System 200 may include one or more management devices 206, which be one or more computing devices (e.g., management servers) associated with an insurance provider. The management devices 206 may be responsible for managing installation of an arbitration assessment assistant on the arbitration assessment computing device 101 and/or network devices 201. As an example, the arbitration assessment computing device 101 may transmit a request to obtain (e.g., download) and install the arbitration assessment assistant. The management device 206 may then authenticate the arbitration assessment computing device 101. For instance, the management device 206 may be communicatively connected with an authentication database that includes a list of approved devices and/or insurance individuals authorized or approved to use the arbitration assessment assistant. The management device 206 may compare authentication credentials received from the arbitration assessment computing device and compare those authentication credentials with authentication credentials stored in the authentication database. If there is a match, the management device 206 may identify the arbitration assessment computing device 101 as authenticated and transmit the arbitration assessment assistant to the arbitration assessment computing device 101 for installation and use. Otherwise, if there is a not a match, the management device 206 might not transmit the arbitration assessment assistant to the arbitration assessment computing device 101. Instead, the management device 206 may send, to the arbitration assessment computing device 101 for display, a message indicating that the arbitration assessment computing device 101 or the individual is not authorized to install the arbitration assessment assistant. As used herein, the authentication credentials may include one or more of media access control (MAC) addresses, username and password, employee identifiers (e.g., employee number, work email address, etc.), a digital certificate, etc. In addition, the system 200 may include a public key infrastructure (PKI) for use in maintaining secure communication sessions between management device 206, arbitration assessment computing device 101, and/or network devices 201. Updates to the arbitration assessment assistant may be uploaded to the management device 206 and distributed to the arbitration assessment computing device 101 and/or other network devices 201.

System 200 may include one or more data sources 207, which may be responsible for storing data relating to an insurance claim. Some data sources 207 may be part of an insurance provider associated with arbitration assessment computing device 101 and may store information including information submitted by the claimant, photographs taken by insurance adjusters, information relating to the insurance claim retrieved from other data sources, and the like. Other data sources 207 might not be associated with the insurance provider. That is, these other data sources 207 may be associated with third party entities, which may include government databases (e.g., police record databases, fire department records databases, hospital records databases, vehicle repair database, and the like), insurance provider databases, and/or other entities that have information relevant to the insurance claim.

System 200 may include one or more subrogation parties 208. As used herein, a subrogation party 208 may be an entity by which the insurance provider associated with the insurance claim may seek reimbursement for expenses incurred as a result of the insurance claim. The subrogation party 208 may be an individual, an insurance provider for an individual, or another entity. The subrogation party 208 may include one or more servers in communication with other devices in system 200 (e.g., arbitration assessment computing device 101, management device 206, etc.). In one example, the insurance provider associated with the insurance claim (which may also be associated with the management device 206 and arbitration assessment computing device 101) pays one or more persons or entities for the insurance claim. If either the insurance provider associated with the insurance claim and/or the arbitration assessment assistant installed on the arbitration assessment computing device 101 determines that another party is at fault for the vehicular accident associated with the insurance claim, the insurance provider associated with the insurance claim and/or the arbitration assessment assistant installed on the arbitration assessment computing device 101 may request the subrogation party 208 to reimburse the insurance provider associated with the insurance claim.

As will by discussed in greater detail below, if the subrogation party 208 refuses to reimburse the insurance provider associated with the insurance claim, the arbitration assessment assistant may analyze the data relating to the insurance claim and determine a confidence score representative of a likelihood of success of obtaining a judgment against the subrogation party 208 for reimbursement for costs associated with the insurance claim. Based on the confidence score, the arbitration assessment assistant may output a recommendation on whether to proceed to arbitration to the insurance adjuster and/or the insurance provider seeking subrogation.

Computer network 203 may be any suitable computer network including the Internet, an intranet, a wide-area network (WAN), a local-area network (LAN), a wireless network (e.g., a satellite network, a cellular network, and/or a combination thereof), a digital subscriber line (DSL) network, a frame relay network, an asynchronous transfer mode (ATM) network, a virtual private network (VPN), or any combination of any of the same. Communications links 202 and 205 may be any communications links suitable for communicating between network devices 201 and computing device 101, such as network links, dial-up links, wireless links, hard-wired links, etc.

The steps that follow in the Figures may be implemented by one or more of the components in FIGS. 1 and 2 and/or other components, including other computing devices.

In accordance with aspects of the disclosure, an arbitration assessment computing device 101 (e.g., a mobile phone, a tablet, a laptop, a computer, etc.) of an insurance representative (e.g., an insurance adjuster) may receive an insurance claim related to an insured vehicle.

Aspects of the disclosure involve a streamlined and efficient process for claims management and disclose methods, computer-readable media, and apparatuses for automating the determining whether claims related to an insured item should proceed to an arbitrating body. A virtual assistant (also referred to herein as a "arbitration assessment assistant") installed in a computing device (e.g., computer, laptop, tablet computer, mobile phone, etc.) may be responsible for managing and assisting an insurance representative (e.g., an insurance adjuster, subrogation representative, etc.) in determining liability and fault relating to a claim, conducting a subrogation process, and ultimately determining whether the claim should be submitted for arbitration. In one or more aspects discussed herein, the process may be fully automated. That is, the arbitration assessment assistant, once triggered, may perform one or more steps described above and output a recommendation as to whether the claim should be submitted for arbitration.

The arbitration assessment assistant may also be responsible for analyzing the claim, identifying missing information useful in determining whether the claim should be arbitrated, obtaining the missing information from various data sources, and analyzing the obtained information to perform the above-described functions (e.g., determining liability, fault, and/or whether to proceed to arbitration).

Figure 3:
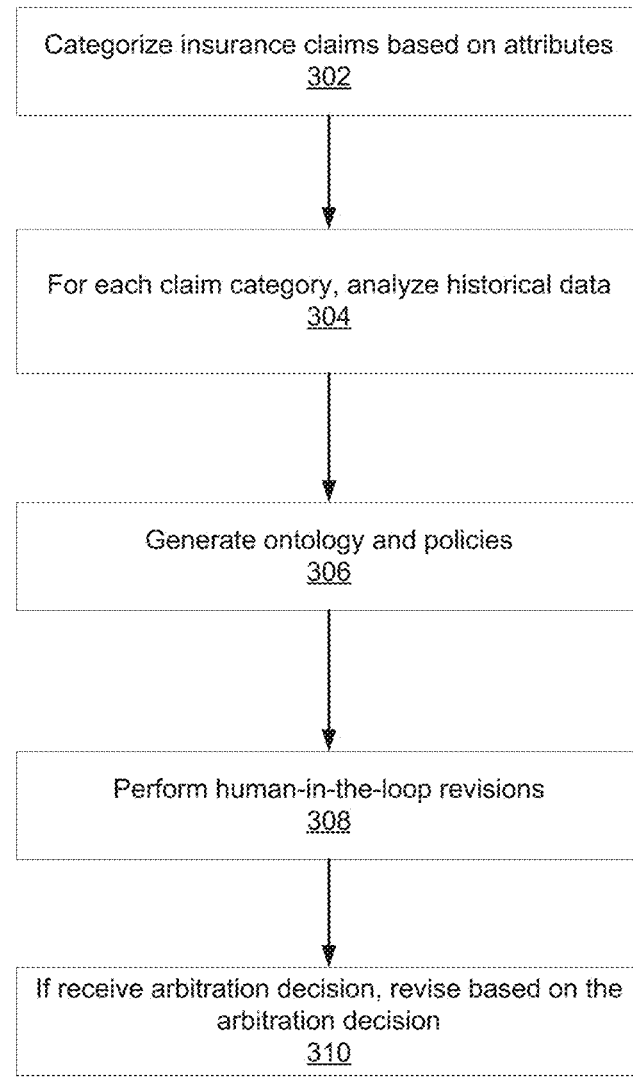
FIG. 3 illustrates an example flow diagram of generating a model for an arbitration assessment assistant, according to one or more aspects discussed herein.

FIG. 3 illustrates an example flow diagram of generating a model for an arbitration assessment assistant, according to one or more example aspects discussed herein. The steps of FIG. 3 may be executable by a processor of the management device 206, arbitration assessment computing device 101, or network device 201 to perform a variety of functions. While the steps of FIG. 3 are shown and described in a particular order, in other embodiments, the steps may be performed in other orders and/or one or more steps may be omitted. The model may be in the form of one or more policies (e.g., rules) for making various determinations described herein. In addition, such policies may be incorporated into one or more software-executable instructions embodying the arbitration assessment assistant and executed by the arbitration assessment computing device 101.

Aspects of FIG. 3 describe development of the arbitration assessment assistant. In some embodiments, cognitive computing and/or artificial intelligence may also be used. As an example, an ontology representing knowledge and/or reasoning for performing various determinations may be generated and may be embodied in the arbitration assessment assistant. The ontology may include multiple concepts interconnected by multiple relations defining the relationship between the concepts. During processing of an insurance claim, data relating to the insurance claim (or its processing) may be used to instantiate the concepts and relations of the ontology with values which may be used in conjunction with one or more prescribed or dynamically generated policies to allow the arbitration assessment assistant to perform various determinations described herein and/or other functionalities (e.g., guide an insurance adjuster to obtain appropriate information for such determinations).

As shown in FIG. 3, the method may begin at step 302 in which the management device 206 may categorize insurance claims based on one or more attributes. For instance, attributes may include various characteristics of an accident or insurance claim. For example, one or more attributes may include a number of vehicles involved in the accident, a number of witnesses to the accident, a speed at which the accident occurred, a damage severity level to vehicles and/or persons involved in the accident, where the accident occurred (e.g., state, county, town, etc.), the speed limit of the road where the accident occurred, type of road where the accident (e.g., highway, town road, neighborhood road, etc.), whether the accident occurred at a traffic intersection, an indicator of how dangerous the intersection where the accident occurred is, the types of vehicles involved in the accident (e.g., commercial vehicle, personal truck, motorcycle, etc.), whether any traffic laws were violated and if so which ones, the subrogation parties 208, who arbitrated the insurance claim, and the like.

The management device 206 may retrieve the attributes of the insurance claims from database storing historical records of the insurance claims, and may group claims that have one or more similar attributes into various categories of insurance claims. As an example, one category of insurance claims may be for accidents that occurred at a traffic light in a particular geographic region. As another example, another category of insurance claims may be for accidents were at least three vehicles were involved in the accident and at least one of the vehicles was a commercial vehicle.

At step 304, the management device 206 may, for each category of insurance claims, analyze historical data of the insurance claims. For instance, for each of the past insurance claims in the category, the management device 206 may identify the insurance claims that were arbitrated in favor of a particular insurance provider and also identify insurance claims that were not arbitrated in favor of the particular insurance provider. The management device 206 may then compare values of each of the attributes in the category of insurance claims that were arbitrated in favor of the particular insurance provider with the corresponding values of the attributes in the category of insurance claims that were not arbitrated in favor of the particular insurance provider. If the average value of an attribute associated with successfully arbitrated insurance claims are within a preset range from (e.g., "similar" to) the average value of the attribute associated with the unsuccessfully arbitrated insurance claims, the attribute might not be indicative of whether an insurance claim is likely to arbitrated in favor of the insurance provider. However, if the average value of an attribute associated with successfully arbitrated insurance claims are not within the preset range from (e.g., "dissimilar" from) the average value of the attribute associated with the unsuccessfully arbitrated insurance claims, the attribute may be indicative of whether or not an insurance claim is likely to arbitrated in favor of the insurance provider.

In cases where the values of the attributes are not within the preset range, the management device 206 may identify the range of values of the attribute associated with insurance claims that were arbitrated in favor of the insurance provider. Such a range of values may also be referred to herein as a favorable value range as it may be indicative that the insurance provider would obtain a favorable judgment in an arbitration of a similar insurance claim. Further, the management device may also identify the range of value of the attribute associated with insurance claims that were not arbitrated in favor of the insurance provider. Such a range of values may also be referred to herein as an unfavorable value range as it may be indicative that the insurance provider would not obtain a favorable judgment in an arbitration of a similar insurance claim. As an example, for the number of vehicles involved in the accident attribute may have a favorable value range of 1-2 vehicles that are involved in the accident and an unfavorable value of range of 3 or more vehicles that are involved in the accident.

Because the favorable value ranges and the unfavorable value ranges for an attribute are specific to each category of insurance claims, different categories of insurance claims may have different favorable value ranges and/or unfavorable value ranges for a particular attribute.

At step 306, the management device 206 may generate an ontology (e.g., a knowledge graph) and one or more policies based on the attributes in each category, the identified favorable value ranges in each category, and the identified unfavorable value ranges in each category. As noted above, an ontology may include a plurality of concepts (e.g., objects, nodes) interconnected by a plurality of relations (e.g., edges) in a similar manner to a directed graph. Each of the attributes may correspond to one of the nodes in the ontology. In addition, concepts relating to vehicular accidents may be part of the ontology.

In one or more additional or alternative arrangements, the management device 206 may also generate policies (rules) specific to a particular category of insurance claims. There may be policies for fault determinations and/or determinations of whether the insurance claims should proceed to arbitration. As an example, a policy may be whether a value for a particular attribute of the insurance claims is within a favorable or unfavorable value range. If the value is within the favorable value range, a value may be added to a confidence score representative of a likelihood of success of obtaining a judgment against the subrogation party 208 for reimbursement for costs associated with the insurance claim. As noted above, based on the confidence score, the arbitration assessment assistant may ultimately output a recommendation on whether to proceed to arbitration to the insurance adjuster and/or the insurance provider seeking subrogation. If the value falls within an unfavorable value range, a value may be deducted from the confidence score as the likelihood of success has been reduced.

Policies relating to identifying and obtaining information useful in performing one or more of the determinations described herein may be generated. As an example, a policy having a particular attribute may specify that a police report is useful and should be obtained. As another example, a policy may indicate that a statement by each witness to the accident should be obtained.

Policies relating to interpreting information may be generated. For instance, one or more policies for interpreting police reports or witness statement may include a list of keywords or ordered combinations of keywords. The policy may also identify a value by which to increase or decrease a confidence score if the keyword or ordered combination of keywords is found in the police report or witness statement.

At step 308, the management device 206 may permit human-in-the-loop revisions. As an example, an administrator may edit the ontology and/or one or more of the generated policies including adding attributes, editing value ranges, and the like. For instance, the administrator may test the arbitration assessment assistant with test data and use the results to make revisions. In addition, the administrator may also add new policies to the arbitration assessment assistant.

At step 310, if a new arbitration decision is obtained, the management device 206 may revise the ontology or policies based on the arbitration decision. For instance, the insurance claim associated with the arbitration decision may be categorized based on its attributes. The values of the attributes may be used to adjust the ranges based on whether the arbitration decision was favorable or unfavorable.

Figure 4:
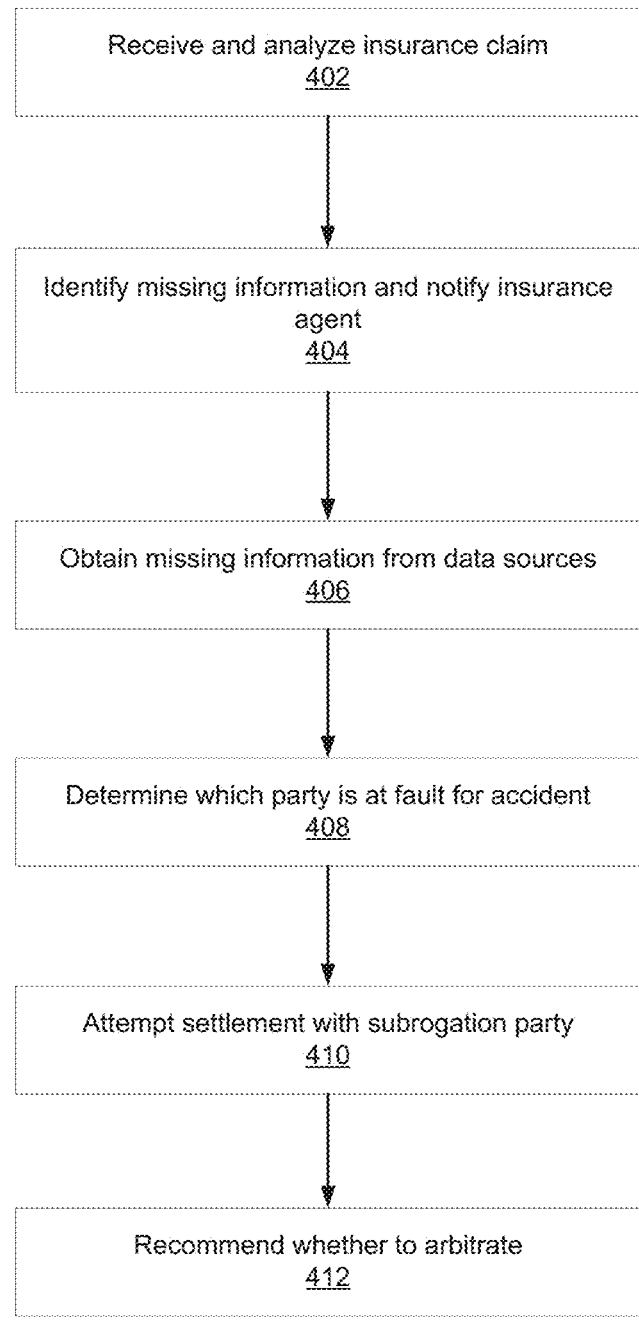
FIG. 4 illustrates an example flow diagram of a method of ultimately outputting a recommendation whether an insurance provider seeking subrogation to an insurance claim should proceed to arbitration, according to or more examples aspects discussed herein.

FIG. 4 illustrates an example flow diagram of a method of ultimately outputting a recommendation whether an insurance provider seeking subrogation to an insurance claim should proceed to arbitration, according to or more examples aspects. The steps of FIG. 4 may be embodied in one or more computer-readable instructions embodied by an arbitration assessment assistant and executable by a processor of the arbitration assessment computing device 101 to cause the arbitration assessment computing device 101 to perform a variety of functions. While the steps of FIG. 4 are shown and described in a particular order, in other embodiments, the steps may be performed in other orders and/or one or more steps may be omitted.

Prior to performing the steps of FIG. 4, an arbitration assessment assistant may be downloaded onto a mobile device of the insurance claims adjuster to facilitate one or more steps of the process in FIG. 3. In some instances, the arbitration assessment assistant may be in the form of a mobile app for use with a mobile phone operating system.

As shown in FIG. 4, the method may begin at step 402 in which the arbitration assessment computing device 101 may receive the insurance claim. In some instances, the arbitration assessment computing device 101 may submit a claim number to the management device 206, which may then determine whether the claim number is valid. If so, the management device may transmit the insurance claim to the arbitration assessment computing device 101 via a communication interface. Otherwise, if the claim number is invalid, the management device 206 may send a message to the arbitration assessment computing device 101 to inform the claims adjuster that the claim number in invalid and to submit a different claim number. In other instances, the insurance adjuster may manually enter, through one or more input components (e.g., a touchscreen, keyboard, etc.) of the arbitration assessment computing device 101, the insurance claim. If the insurance claim does not have a claim number, the arbitration assessment assistant may generate a claim number and submit both the claim number and the insurance claim to the management device 206. The insurance claim may include vehicle information (e.g., vehicle identification number, make, model, and year of manufacture). The insurance claim may also include general areas of damage to the vehicle and other relevant details (e.g., condition of glass, under carriage, engine, wheels, airbags, etc. associated with the vehicle). The insurance claim may include a description of how the accident occurred according to the claimant.

At step 404, the arbitration assessment assistant installed on the arbitration assessment computing device 101 may identify missing information and notify the insurance adjuster of the missing information. For instance, the arbitration assessment assistant may determine one or more attributes of the insurance claim and determine a category to which the insurance claim belongs. Using the policies associated with that category of insurance claims, the arbitration assessment assistant may then identify information useful in performing one or more determinations described herein (e.g., determinations of fault, determinations of likelihood of success in arbitration, etc.). The information useful in performing one or more determinations described herein may be compared against the information relating to the insurance claim already stored at the arbitration assessment computing device 101. Based on the comparison, missing information may be identified.

In some cases, the missing information may be associated with a particular attribute discussed above. For example, the missing information may include one or more of the number of vehicles involved in the accident, number of witnesses to the accident, speed at which the accident occurred, a damage severity level to vehicles and/or persons involved in the accident, where the accident occurred (e.g., state, county, town, etc.), the speed limit of the road where the accident occurred, type of road where the accident (e.g., highway, town road, neighborhood road, etc.), whether the accident occurred at a traffic intersection, an indicator of how dangerous the intersection where the accident occurred is, the types of vehicles involved in the accident (e.g., commercial vehicle, personal truck, motorcycle, etc.), whether any traffic laws were violated and if so which ones, the subrogation parties 208, who arbitrated the claim, and the like.

In addition to identifying the missing information, the arbitration assessment management assistant may also identify in which types of documents and/or data sources 207 the missing information is likely to be found. As an example, the arbitration assessment assistant may determine that a witness's statement is missing and that the witness's statement may likely be found in a police report stored in a particular data source 207 (e.g., the policy records database). As another example, the arbitration assessment assistant may determine that the damage severity level of individuals involved in the accident is missing and that this information may likely be found in a hospital records database.

Figure 5:
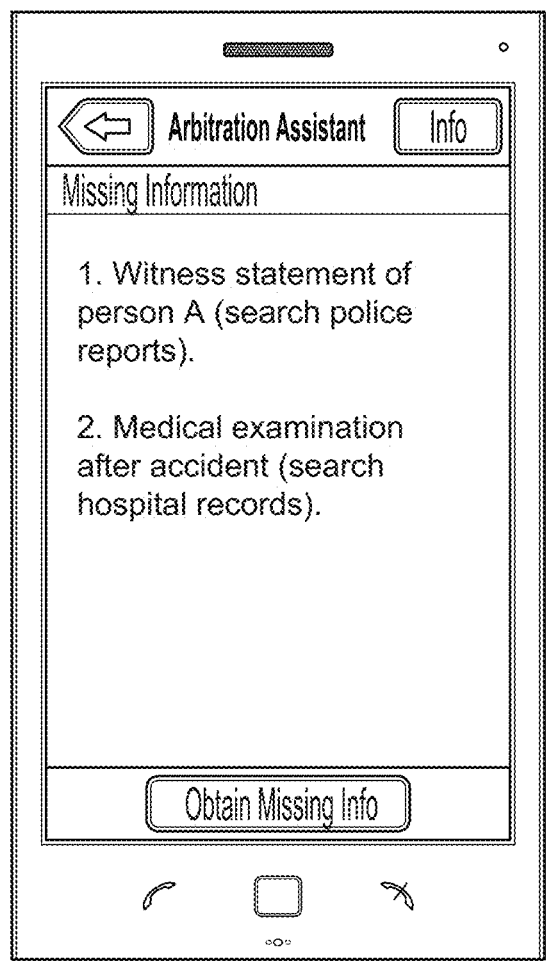
FIG. 5 shows an example display screen notifying an insurance adjuster of missing information relevant to determination of whether an insurance claim should proceed to arbitration, according to one or more example aspects discussed herein.

In some embodiments, the arbitration assessment assistant may notify and/or otherwise display, to the insurance adjuster, what information is missing and where this information may be found (e.g., in what types of documents and/or at which data sources 207). FIG. 5 shows an example display screen 500 of the arbitration assessment assistant notifying an insurance adjuster of missing information relevant to determination of whether an insurance claim should proceed to arbitration, according to one or more example aspects discussed herein. In other embodiments, the arbitration assessment assistant might not notify the insurance adjuster of the missing information and may instead automatically proceed to step 406.

At step 406, the arbitration assessment assistant may obtain the missing information from one or more of the data sources 207 either automatically or in response to input received from the insurance adjuster. The arbitration assessment assistant may search the various data sources 207 for the missing information using the information it already has obtained. In one example, the arbitration assessment assistant may search for a police accident report relating to the insurance claim by using one or more of, for example, a police report identification number, names of the persons involved in the accident, vehicle identification numbers of vehicles involved in the accident, and the like, to format a query. The query may then be transmitted to the data source 207 (e.g., a police records database) to obtain the appropriate police report. If a police report is found that matches one or more items in the query, that police report may be transmitted to the arbitration assessment assistant. Otherwise, if a police report is not found since none of the police reports match the one or more items in the query, an indication that a matching police report was not found may be transmitted to the arbitration assessment assistant for display to the insurance adjuster. The insurance adjuster may then manually edit and resubmit the query to the police records database.

Similarly, in another example, the arbitration assessment assistant may search for a medical or hospital record of an individual involved in the accident relating to the insurance claim by using one or more of, for example, a patient identifier number and/or names of the persons involved in the accident to format a query. The query may also include permissions to enable the hospital record to be released. The query may then be transmitted to the data source 207 (e.g., a medical records database) to obtain the appropriate medical records. If a medical record is found that matches one or more items in the query, that medical record may be transmitted to the arbitration assessment assistant. Otherwise, if no medical records are since none of the medical records match the one or more items in the query, an indication that a matching medical record was not found may be transmitted to the arbitration assessment assistant for display to the insurance adjuster. The insurance adjuster may then manually edit and resubmit the query to the medical records database and/or investigate (e.g., contact other individuals) to find the missing information.

As the arbitration assessment assistant obtains more information, it may use newly obtained information to update the searches for missing information found in the data sources 207. Once the arbitration assessment assistant receives a record or document (e.g., a police record, a medical record, etc.), it may determine whether it can recognize the text in the report. If not, the arbitration assessment assistant may apply an optical character recognition (OCR) algorithm to the document in order to recognize text contained therein. Once the text contained in the document or record is recognizable, it may be parsed to identify words, symbols, and punctuation in the document. The parsing algorithm may also identify whether the word is a noun, verb, adjective, etc. Further, the parsing algorithm may also identify particular keywords and/or co-occurrences of keywords (e.g., two keywords within a preset number of words from one another, within the same sentence, and/or within the same paragraph). In some cases, one or more keywords may be specific to the type of document being parsed. For instance, the keywords for a police report may be different than the keywords for a medical record. Some of the keywords or combination of keywords may be field identifiers used in the specific document. The parsing algorithms may identify a preset number sentences (or paragraphs) following the field identifier as relating to that field identifier. For example, a field identifier may be "Description of Incident" and may identify a preset number of sentences or paragraphs following this field identifier as relating to a description of the incident.

Additionally or alternatively, the parsing algorithm may identify the sentences or paragraphs following a field identifier as related to that field identifier, until another field identifier is encountered. For example, a field identifier may be "First Witness's Statement" and may identify the sentences or paragraphs following this field identifier as relating to first witness's statement, until another field identifier is encountered (e.g., the field identifier "Second Witness's Statement").

In some cases, the data source 207 may include sensor data from sensors of the vehicles involved in the accident. The arbitration assessment assistant may interpret the sensor data to determine information, such as, the speed of the vehicle, whether the vehicle swerved, and the like.

At step 408, the arbitration assessment assistant may determine which individual involved in the accident is at fault. Initially, the arbitration assessment assistant may identify each individual involved in the accident related to the insurance claim. The individuals may be identified from insurance claim itself, the police report, and/or any other documents obtained by the arbitration assessment assistant with respect to the insurance claim. Once a list of potential individuals who may be at fault is generated, the arbitration assessment assistant may determine which individual is most likely at fault using one or more of the policies of the category associated with the insurance claim. In some arrangements, the arbitration assessment assistant may, for each potential individual, determine a fault score using one or more policies described herein. That is, each policy may specify a preset value by which to increase or decrease a fault score based on whether a condition specified in the policy is met (or, alternatively, not met). In some cases, one or more of these policies may be the same policies used in determining whether to arbitrate the claim. In some cases, there may be a policy specific to each attribute of the insurance claim. In one example, one policy may be to determine whether the police report includes information identifying fault. For instance, a police officer's statement or witness's statement in the police report may identify a particular individual as being at fault. If so, a fault score of the person may be increased by a preset value identified in the policy. In another example, one policy may be to determine whether a person violated a traffic law. If so, a fault score of the person may be increase by another preset value.

In addition to using the preset policies, the arbitration assessment assistant may also determine which of the prior insurance claims has a factual scenario most similar to the factual scenario of the current insurance claim. For instance, the arbitration assessment assistant may consult a historical database or table (e.g., spreadsheet) that lists each of the attribute and relevant facts for each insurance claim that has been arbitrated. The arbitration assessment assistant may identify the individual in the current factual scenario that corresponds to the individual determined to be at fault in the factual scenario of the prior insurance claims, and may increase the identified individual's fault score by a preset value.

Once a fault score for each individual potentially at fault is computed, the arbitration assessment assistant may identify the individual with the highest fault score as the individual at fault for causing the accident related to the insurance claim.

At step 410, the arbitration assessment assistant may attempt to settle the insurance claim with a subrogation party 208. The arbitration assessment assistant may determine whether a third party (and not the policy holder) is at fault for the accident relating to the insurance claim. If so, the arbitration assessment assistant may determine whether any payments have been made to any parties in relation to the insurance claim. If so, the arbitration assessment assistant may send a request for subrogation to the determined third party and/or the determined third party's insurance provider (which may be collectively referred to herein as the subrogation party 208). The request may ask the subrogation party 208 to reimburse the insurance provider associated with the policy holder for payouts made in response to the insurance claim. The request may identify the insurance claim, the third party determined to be at fault, each payout and to whom each payout was sent (e.g., a vehicle repair bill payout, a hospital bill payout, and the like), and/or other information. In some cases, the request may also include a summary report summarizing the facts relevant in determining that the determined third party is at fault for the accident. Following the above examples, the summary report may specify that a police officer and/or witness stated that the third party was at fault. Additionally, the summary report may specify that the third party violated one or more traffic laws just prior to the accident and may identify the traffic laws violated and how the third party violated those traffic laws. In addition, the summary report may include references to supporting documents or may include a copy of the document (e.g., the police report, etc.).

If a preset time period has elapsed without receiving a response from the subrogation party 208, the arbitration assessment assistant may resend the request. Once a preset maximum number of requests have been sent without a response, the arbitration assessment agent may identify the subrogation party 208 as refusing to subrogate (e.g., reimburse) the insurance provider associated with the policy holder, and the arbitration assessment assistant may proceed to step 412. If the subrogation party 208 refuses to reimburse the insurance provider, then the arbitration assessment assistant may proceed to step 412.

At step 412, the arbitration assessment assistant may recommend whether to arbitrate the insurance claim. For instance, the arbitration assessment assistant may analyze the obtained information using the ontology and policies to determine a confidence score indicative of a likelihood of success in an arbitration proceeding seeking subrogation against the subrogation party 208. The arbitration assessment assistant may instantiate an instance of the ontology using the attribute values and factual scenario related to the insurance claim. The ontology itself may specify different values by which to increase or decrease the confidence score based on different combinations of facts or attribute values. In addition, policies for the category of the insurance claim relating to determining whether the insurance claim should be arbitrated may be applied to the obtained information relating to the insurance claim. Each of such policies may also specify a value by which to increase or decrease the confidence score for the insurance claim if a particular condition is satisfied. As discussed above, a policy may specify a favorable value range and an unfavorable value range for a particular attribute. If the value for the attribute related to the insurance claim falls within the favorable value range, the confidence score may be increased by a value specified in the policy. If the value for the attribute related to the insurance claim falls within the unfavorable value range, the confidence score may be reduced by a value specified in the policy. If the value for the attributed related to the insurance claim does not fall within either a favorable value range or an unfavorable value range, the confidence score might not be adjusted with respect to that attribute. In some cases, particular combinations of attributes having particular values may result in the confidence score being increased or decreased by a particular value.

Additionally or alternatively, the arbitration assessment assistant may also determine which of the prior insurance claims has a factual scenario most similar to the factual scenario of the current insurance claim. For instance, the arbitration assessment assistant may consult a historical database or table (e.g., spreadsheet) that lists each of the attribute and relevant facts for each insurance claim that has been arbitrated. Based on the outcome of the arbitration in the prior insurance claim, the confidence score may be further increase or decreased by a value. If the prior insurance claim was arbitrated in favor of subrogation, the confidence score may be increased. Otherwise, if the prior insurance claim was not arbitrated in favor of subrogation, the confidence score may be decreased.

Once the total confidence score has been determined, the arbitration assessment assistant may compare it against a minimum confidence score threshold. If the confidence score is less than the minimum confidence score threshold, the arbitration assessment assistant may determine to recommend not submitting the insurance claim for arbitration as the likelihood of success is too low. However, if the confidence score is equal to or greater than the minimum confidence score threshold, the arbitration assessment assistant may determine to recommend submitting the insurance claim for arbitration as the likelihood of success is high enough to justify proceeding to arbitration.

Figure 6:
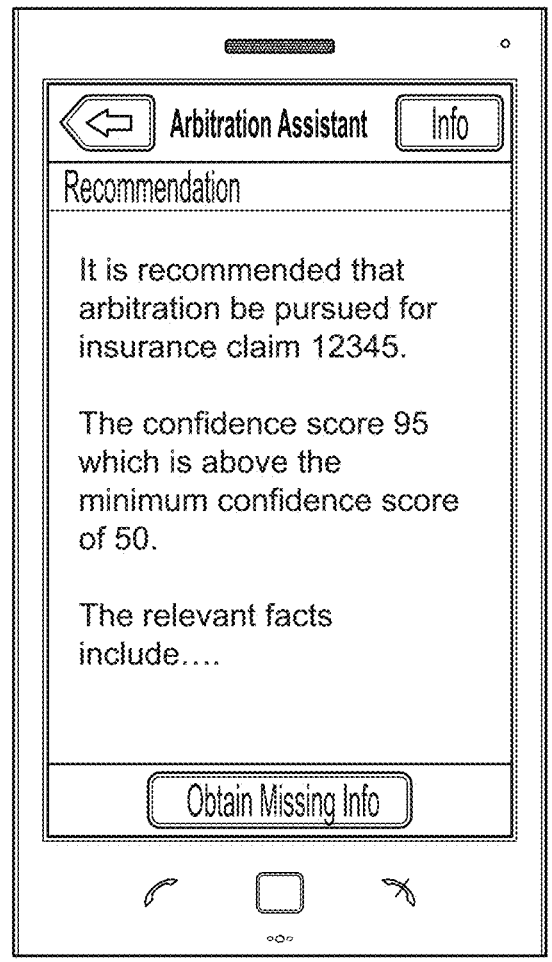
FIG. 6 shows an example display screen notifying the insurance adjuster of a recommendation whether an insurance claim should proceed to arbitration, according to one or more example aspects discussed herein.

In some embodiments, the arbitration assessment assistant may display, to the insurance adjuster, the recommendation of whether to proceed to arbitration, the confidence score, an arbitration summary report, and/or the copies of the relevant documents. In some cases the confidence score may be presented overlaying a color-coded bar representing the range of different possible scores with low confidence scores (e.g., confidence scores below the preset minimum confidence score threshold) being in a red color, with medium confidence scores (e.g., confidence score that are equal to or greater than the preset minimum confidence score threshold but only by less than a preset amount) being in a yellow color, and with high confidence scores (e.g., confidence score that are equal to or greater than the preset minimum confidence score threshold by at least the preset amount) being in a green color. The arbitration summary may include a list of relevant facts used in determining the confidence score and reference relevant documents (e.g., police reports, medical reports, etc.). FIG. 6 shows an example display screen 600 of the arbitration assessment assistant notifying the insurance adjuster of a recommendation whether an insurance claim should proceed to arbitration, according to one or more example aspects discussed herein. Additionally or alternatively, the recommendation of whether to proceed to arbitration, the confidence score, an arbitration summary report, and/or the copies of the relevant documents may be sent to the management device 206.

In some embodiments, the insurance adjuster or associated insurance provider may submit the insurance claim to an arbitrating entity for arbitration regarding the subrogation of expenses incurred by the insurance provider. In other embodiments, the arbitration assessment assistant may itself submit the insurance claim to the arbitrating entity electronically, if the confidence score is equal to or greater than the preset minimum score threshold. For instance, the arbitration assessment assistant may populate one or more forms for an arbitration entity using the obtained information related to the insurance claim. The arbitration assessment assistant may then electronically transmit a request for arbitration, the one or more forms, and/or supporting documents to the arbitration entity. The request for arbitration may identify the insurance claim, the paid out amounts to be reimbursed, the third party determined to be at fault, the subrogation party 208, the subrogation party's 208 relationship to the third party determined to be at fault, and the like. As a result, the insurance provider might not have to waste valuable time having an insurance representative determine and submit these items to the arbitrating entity.

The various steps performed herein by the arbitration assessment assistant may be updated throughout the life of the claim. For instance, as more information relating to the insurance claim is obtained, the arbitration assessment assistant may update its determination in real-time.

In one or more embodiments, an arbitration assessment computing device may include a processor and a memory. The memory may include one or more computer-readable instructions that, when executed by the processor, cause the arbitration computing device to perform the following steps. The arbitration assessment computing device may receive an insurance claim related to an accident and identify missing information related to the insurance claim and useful in determining at least one of fault of the accident and whether to pursue arbitration with respect to the insurance claim. In response to determining that a third party is at fault for the accident and refusing to reimburse an insurance provider for payouts relating to the insurance claim, the arbitration assessment computing device may compute a confidence score indicative of a likelihood of obtaining a judgment from an arbitrating entity in favor or reimbursement of the payouts from the subrogation entity. In response to determining that the confidence score is equal to or greater than a preset minimum confidence score threshold, populating one or more forms, consolidating supporting documents and submitting the one or more form and the consolidated supporting documents to the arbitrating entity.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software but the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

What is claimed is:

1. A system comprising:
   a processor; and
   a memory storing computer-readable instructions that, when executed by the processor, cause the processor to trigger execution of an arbitration assessment assistant, wherein the arbitration assessment assistant is configured to automatically:
   receive, from a first computing device, an insurance claim comprising a plurality of attributes;
   determine, based on one or more attributes of the plurality of attributes, one or more categories to associate with the insurance claim;
   identify, based on historical data, a value range associated with each of the one or more categories;
   determine a confidence score indicative of a likelihood of success in an arbitration request associated with a third-party by:
      generating an ontology comprising a plurality of nodes interconnected by a plurality of edges, wherein each node of the plurality of nodes is associated with a respective attribute of the plurality of attributes, the ontology generated based upon the plurality of attributes and the value ranges associated with each of the one or more categories;
      instantiating the ontology by associating each node of the plurality of nodes with an attribute value of a plurality of attribute values;
      comparing each of the attribute values with the value ranges associated with each of the one or more categories; and
      determining, based on the ontology and the comparison, the confidence score; and
   output an arbitration recommendation to a user based on the confidence score, wherein the arbitration recommendation comprises the confidence score and one or more factors used to determine the confidence score.

2. The system of claim 1, wherein the outputting the arbitration recommendation to the user based on the confidence score comprises:
   comparing the confidence score to a minimum confidence score threshold; and
   outputting the arbitration recommendation based on a result of the comparing.

3. The system of claim 1, wherein the insurance claim 1, is related to an accident and wherein the plurality of attributes comprises one or more of:
   a number of vehicles involved in the accident;
   a number of witnesses to the accident;
   a damage severity level to one or more vehicles involved in the accident; and
   a location of the accident.

4. A method, comprising:
triggering execution of an arbitration assessment assistant, wherein the arbitration assessment assistant is configured to automatically cause:
receiving, from a first computing device, an insurance claim comprising a plurality of attributes;
determining, based on one or more attributes of the plurality of attributes, one or more categories to associate with the insurance claim;
identifying, based on historical data, a value range associated with each of the one or more categories;
determining a confidence score indicative of a likelihood of success in an arbitration request associated with a third-party by:
generating an ontology comprising a plurality of nodes interconnected by a plurality of edges, wherein each node of the plurality of nodes is associated with a respective attribute of the plurality of attributes, the ontology generated based upon the plurality of attributes and the value ranges associated with each of the one or more categories;
instantiating the ontology by associating each node of the plurality of nodes with an attribute value of a plurality of attribute values;
comparing each of the attribute values with the value ranges associated with each of the one or more categories; and
determining, based on the ontology and the comparison, the confidence score; and
outputting an arbitration recommendation to a user based on the confidence score, wherein the arbitration recommendation comprises the confidence score and one or more factors used to determine the confidence score.

5. The method of claim 4, wherein the outputting the arbitration recommendation to the user based on the confidence score comprises:
comparing the confidence score to a minimum confidence score threshold; and
outputting the arbitration recommendation based on a result of the comparing.

6. The method of claim 4, wherein the insurance claim is related to an accident and wherein the plurality of attributes comprises one or more of:
a number of vehicles involved in the accident;
a number of witnesses to the accident;
a damage severity level to one or more vehicles involved in the accident; and
a location of the accident.

7. The system of claim 1, wherein the one or more categories to associate with the insurance claim comprise one or more of:
accidents that occurred at a traffic light in a particular geographic region; and
accidents in which at least three vehicles were involved and at least one of the vehicles was a commercial vehicle.

8. The system of claim 1, wherein the ontology is a knowledge graph comprising:
a plurality of concepts related to vehicular accidents; and
a plurality of relations between the plurality of concepts related to vehicular accidents.

9. The system of claim 1, wherein the arbitration assessment assistant is further configured to automatically generate one or more policies based on at least one of the plurality of attributes or the one or more categories.

10. The system of claim 1, wherein the arbitration request is based on a refusal to subrogate by one or more parties to the insurance claim.

11. The method of claim 4, wherein the one or more categories to associate with the insurance claim comprise one or more of:
accidents that occurred at a traffic light in a particular geographic region; and
accidents in which at least three vehicles were involved and at least one of the vehicles was a commercial vehicle.

12. The method of claim 4, wherein the ontology is a knowledge graph comprising:
a plurality of concepts related to vehicular accidents; and
a plurality of relations between the plurality of concepts related to vehicular accidents.

13. The method of claim 4, wherein the arbitration assessment assistant is further configured to automatically cause generating one or more policies based on at least one of the plurality of attributes or the one or more categories.

14. The method of claim 4, wherein the arbitration request is based on a refusal to subrogate by one or more parties to the insurance claim.

15. A non-transitory computer-readable storage medium having computer-executable program instructions stored thereon that when executed by a processor, cause the processor at least to:
receive, from a first computing device, an insurance claim comprising a plurality of attributes;
determine, based on one or more attributes of the plurality of attributes, one or more categories to associate with the insurance claim;
identify, based on historical data, a value range associated with each of the one or more categories;
determine a confidence score indicative of a likelihood of success in an arbitration request associated with a third-party by:
generating an ontology comprising a plurality of nodes interconnected by a plurality of edges, wherein each node of the plurality of nodes is associated with a respective attribute of the plurality of attributes, the ontology generated based upon the plurality of attributes and the value ranges associated with each of the one or more categories;
instantiating the ontology by associating each node of the plurality of nodes with an attribute value of a plurality of attribute values;
comparing each of the attribute values with the value ranges associated with each of the one or more categories; and
determining, based on the ontology and the comparison, the confidence score; and
output an arbitration recommendation to a user based on the confidence score, wherein the arbitration recommendation comprises the confidence score and one or more factors used to determine the confidence score.

16. The non-transitory computer-readable storage medium of claim 15, wherein the outputting the arbitration recommendation to the user based on the confidence score comprises:
comparing the confidence score to a minimum confidence score threshold; and
outputting the arbitration recommendation based on a result of the comparing.

17. The non-transitory computer-readable storage medium of claim 15, wherein the insurance claim is related to an accident and wherein the plurality of attributes comprises one or more of:
- a number of vehicles involved in the accident;
- a number of witnesses to the accident;
- a damage severity level to one or more vehicles involved in the accident; and
- a location of the accident.

18. The non-transitory computer-readable storage medium of claim 15, wherein the one or more categories to associate with the insurance claim comprise one or more of:
- accidents that occurred at a traffic light in a particular geographic region; and
- accidents in which at least three vehicles were involved and at least one of the vehicles was a commercial vehicle.

19. The non-transitory computer-readable storage medium of claim 15, wherein the ontology is a knowledge graph comprising:
- a plurality of concepts related to vehicular accidents; and
- a plurality of relations between the plurality of concepts related to vehicular accidents.

20. The non-transitory computer-readable storage medium of claim 15, wherein the computer-executable program instructions further cause the processor to automatically generate one or more policies based on at least one of the plurality of attributes or the one or more categories.

* * * * *